(12) United States Patent
Bares

(10) Patent No.: US 6,299,207 B1
(45) Date of Patent: *Oct. 9, 2001

(54) REAR MOUNTED OPERATOR RESTRAINT BAR

(75) Inventor: Mark F. Bares, Oakes, ND (US)

(73) Assignee: Clark Equipment Company, Woodcliff Lake, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,082

(22) Filed: Jul. 14, 1999

(51) Int. Cl.[7] ................................................ B60R 21/02
(52) U.S. Cl. .......................... 280/748; 280/753; 180/268
(58) Field of Search .................................. 180/268–271, 180/275; 280/748, 751, 753; 104/241

(56) References Cited

U.S. PATENT DOCUMENTS

| | | | |
|---|---|---|---|
| 1,597,491 | * 8/1926 | Traver | 104/241 |
| 2,755,101 | 7/1956 | Budde | 280/150 |
| 3,453,026 | * 7/1969 | Paes et al. | 297/384 |
| 3,494,633 | * 2/1970 | Malloy | 280/150 |
| 3,640,572 | * 2/1972 | Doehler | 297/390 |
| 3,888,329 | * 6/1975 | Monaghan | 180/103 |
| 3,899,042 | * 8/1975 | Bonar | 180/82 C |
| 3,993,157 | 11/1976 | Schulte | 180/111 |
| 4,008,626 | 2/1977 | Schulte et al. | 74/491 |
| 4,388,980 | 6/1983 | Vig et al. | 180/271 |
| 4,391,344 | 7/1983 | Weber et al. | 180/271 |
| 4,392,660 | 7/1983 | Mason et al. | 280/751 |
| 4,397,371 | * 8/1983 | Lynnes et al. | 180/271 |
| 4,480,713 | 11/1984 | Macht et al. | 180/268 |
| 4,579,191 | 4/1986 | Klee et al. | 180/268 |
| 4,603,877 | * 8/1986 | Espinoza et al. | 280/807 |
| 4,955,452 | 9/1990 | Simonz | 180/271 |
| 5,050,700 | 9/1991 | Kim | 180/268 |
| 5,100,173 | 3/1992 | Kudler | 280/748 |
| 5,129,478 | 7/1992 | Suenaga et al. | 180/268 |
| 5,383,532 | 1/1995 | Shonai et al. | 180/269 |
| 5,454,596 | * 10/1995 | Dirck | 280/748 |
| 5,481,909 | * 1/1996 | Deutsch et al. | 73/117.3 |
| 5,664,637 | 9/1997 | Ohta et al. | 180/286 |
| 5,871,063 | * 2/1999 | Young | 180/268 |
| 5,944,135 | * 8/1999 | Blackburn et al. | 180/268 |

FOREIGN PATENT DOCUMENTS 2 328 268 A    2/1999  (GB) .

* cited by examiner

Primary Examiner—J. J. Swann
Assistant Examiner—L. Lum
(74) Attorney, Agent, or Firm—Westman, Champlin & Kelly, P.A.

(57) ABSTRACT

A operator restraint bar for a working vehicle, specifically for a skid steer loader, is mounted on the rear wall of the cab of the loader and is movable from a restraint position to a raised position with one end adjacent the roof of the cab. The restraint bar is mounted onto brackets that are self contained and include a spring for holding the bar in either its working position or its raised position by arranging the pivot points of the bar and the spring so that they go over center between the working and raised positions. A sensor is used at the pivot for indicating when the restraint bar has reached its working position.

20 Claims, 6 Drawing Sheets

REAR MOUNTED OPERATOR RESTRAINT BAR

BACKGROUND OF THE INVENTION

The present invention relates to loader operator restraint bars for mounting in skid steer loader cabs, wherein the bar is mounted on the rear wall and the front cross member moves upwardly to a non-restraint position and then downwardly to a position where it extends across the lap of an operator sitting on the seat. The restraint bar position can be sensed for use with an operating interlock for the loader such that when the restraint bar is raised, operation of at least some function of the loader is prevented.

U.S. Pat. No. 4,397,371 illustrates an operator restraint system which has a restraint member that is mounted at the forward side of an operator's cab, and is tied into a control system of the loader.

Rear mounted restraint systems also have been utilized, for example, those shown in U.S. Pat. Nos. 5,050,700 and 5,383,532.

The existing rear mounted restraint bars are relatively complex in mounting, and a simplified, easily installed and easily operated restraint for an operator is desired.

SUMMARY OF THE INVENTION

The present invention relates to a rear mounted operator restraint bar or seat bar, that mounts on the rear wall of an operator cab of a skid steer loader, where the mounting is out of the way and leaves the front cab area unobstructed. The restraint bar is a U-shaped member that has a pair of mounting brackets for side legs on the rear wall, each with a self-contained spring. The bracket springs will urge the bar to a restraint position after it has been lowered near such position, and when lifted by the operator, will hold the bar is a release position so that the operator can move in and out of the cab.

In the restraint position, restraint bar mounting one bracket can mount a sensor that will provide a signal indicating that the restraint bar is in a selected position, and couple the signal into a control system so that the loader drive and operating systems are disabled unless the restraint bar is down.

Various other serial interlocks can be used with the restraint bar sensor desired.

DETAILED DESCRIPTION OF THE ILLUSTRATIVE EMBODIMENTS

A cab 10 of a skid steer loader is of conventional design, and the skid steer loader on which it goes is also of conventional design. The cab, as shown, has the windows removed, but has the front end 12, and a rear wall 14. An operator's seat 16 is made for an operator, who will sit and operate controls of conventional design.

An operator restraint bar or seat bar indicated generally at 20 as shown, is mounted onto the rear wall 14, so that it extends forwardly. The bar 20 is a generally U-shaped bar that has a forward cross member 21 that extends laterally across the lap of an operator sitting on the seat 16, and fore and aft extending side arms 23. The side arms 23 are bent and have generally uprightly inclined portions 24 that are mounted onto separate restraint bar mounting bracket assemblies 26 and 28, respectively.

Figure 3:
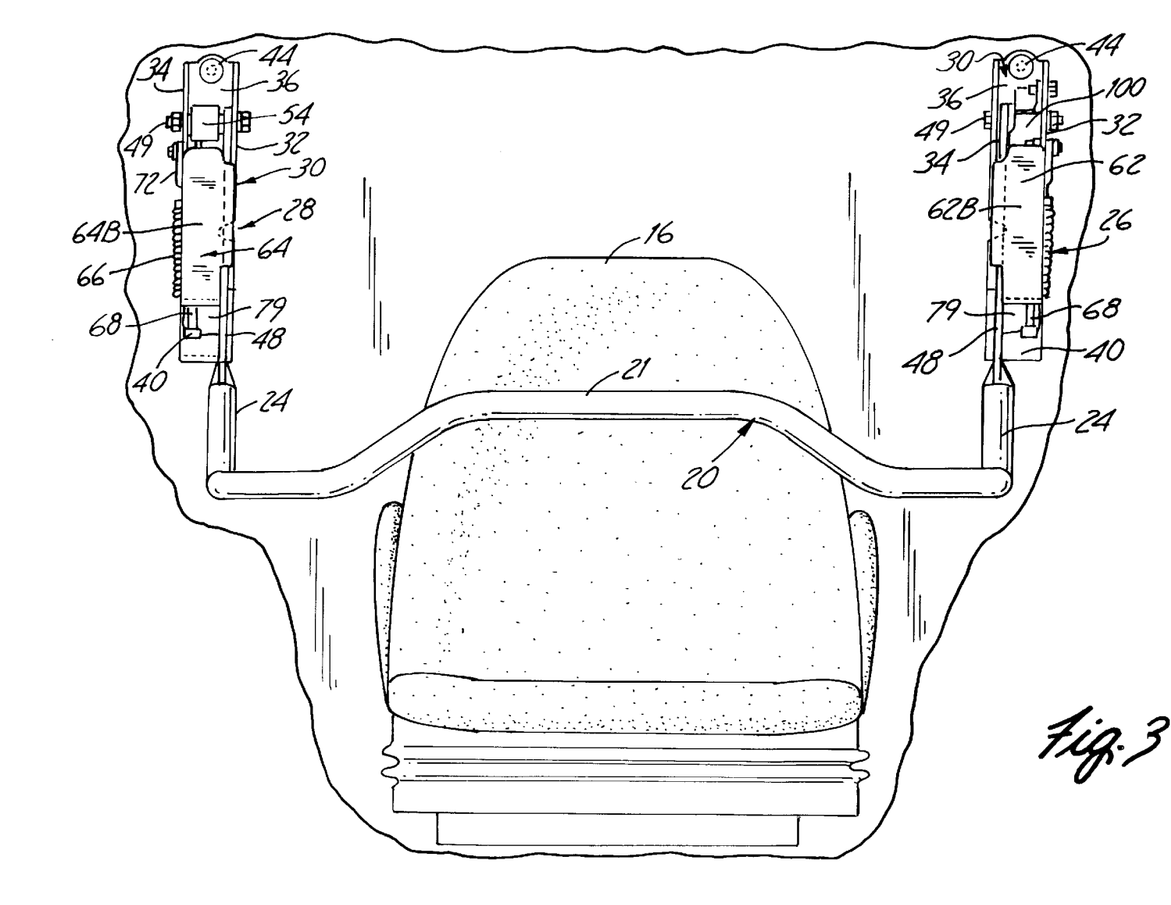
FIG. 3 is a front elevational view of the restraint bar of FIG. 2.
Figure 4:
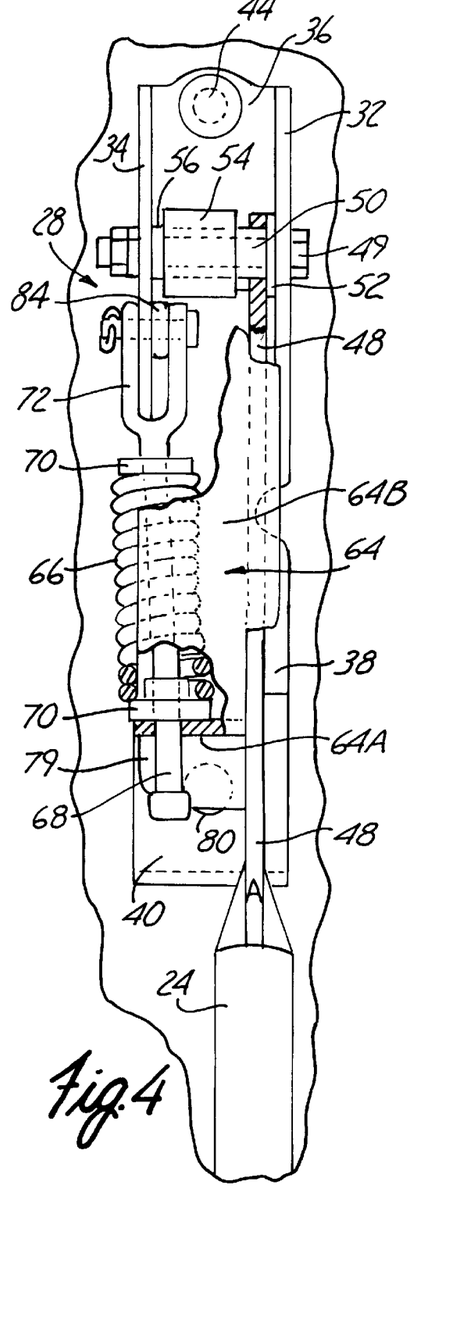
FIG. 4 is an enlarged view of the mounting bracket assembly on the left side of FIG. 3.
Figure 5:
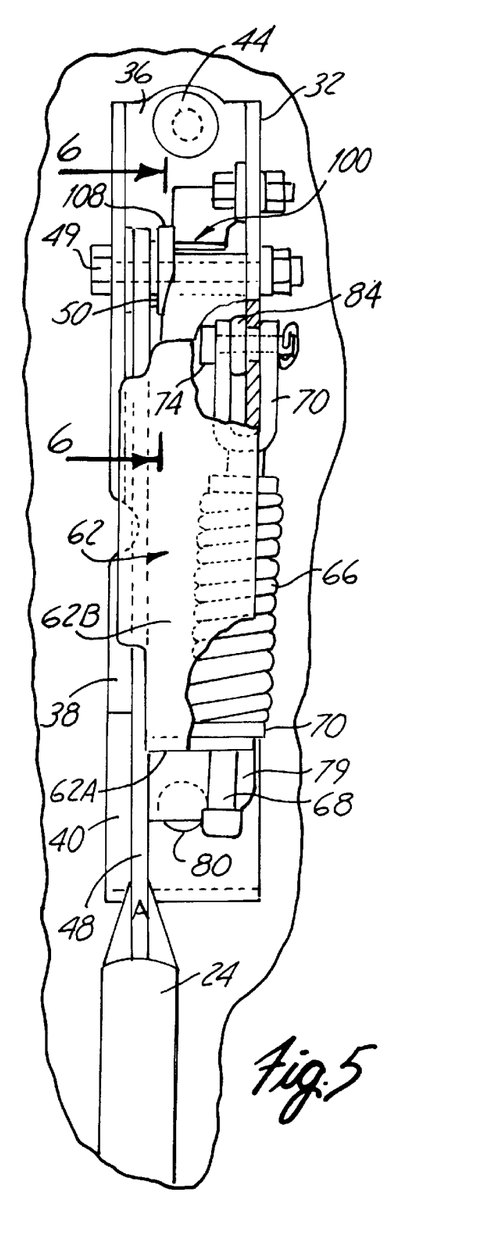
FIG. 5 is an enlarged view of the mounting bracket on the right side of FIG. 3.

Referring to FIGS. 3, 4 and 5, it can be seen that the restraint bar bracket assemblies 26 and 28 are essentially the same, except being adapted for the right and left sides and the mounting bases can be interchanged. The mounting for the restraint bar itself is slightly different for the right and left sides.

Figure 7:
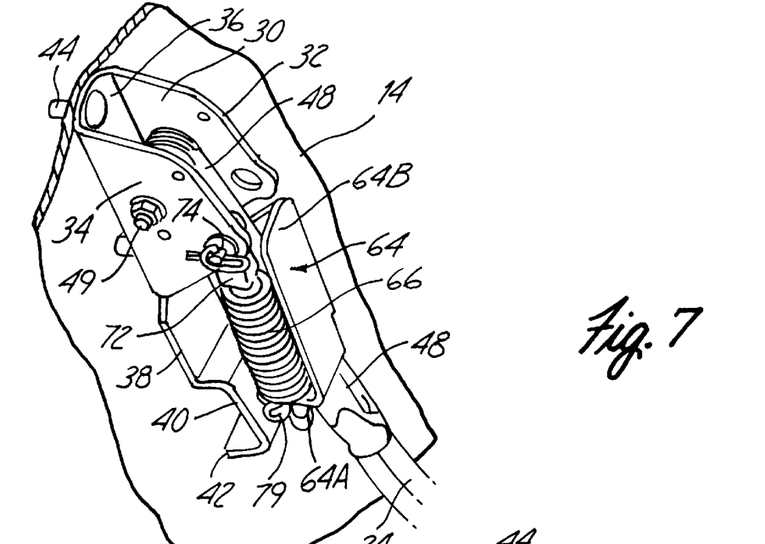
FIG. 7 is a perspective view of the bracket on the left hand side of FIG. 8.

Each of the restraint bar bracket assemblies has a generally U-shaped channel base 30 that is formed as a unitary channel having spaced apart legs 32 and 34, that extend forwardly from a base wall 36. A downwardly extending support tongue or wall 38 is integral with the base wall 36 (see FIG. 7, for example) and is formed to provide a planar offset stop wall portion 40, and a leg 42 that is bent back toward the cab rear wall 14 and rests against the wall 14 when the bracket assemblies 26 and 28 are fastened in place with suitable bolts or cap screws indicated at 44, in FIGS. 1 and 2, for example.

The laterally extending restraint bar cross member 21, the restraint bar side arms 23, and the lower parts 24 of the vertical or upright sections of the restraint bar are tubular, and are selected to be capable of absorbing energy from loads exerted when the operator tends to be moved under inertial forces. The operator also will use a conventional lap belt, which is not shown.

The arm portions 24 are joined to flat bar pivot arms 48 that are used for pivotally mounting the restraint bar to the respective bracket assemblies 26 and 28 on pivot pins 49 that extend between the individual legs 32 and 34 of each of the bases 30. This can be seen in FIGS. 4 and 5, which show the difference in mounting for the right and left-hand bracket assemblies 26 and 28. In FIG. 4 the pivot arm 48 is broken away to show that the pivot arms 48 have a large pivot opening that fits onto a bushing 50 that has a thrust flange 52 that rides against the leg 32 of the bracket assembly 28 on that side of the cab. A spacer 54 is used in connection with another bushing 56 to hold that pivot arm 48 against the leg 32 of the base 30. The spacers will positively position the pivoting section 48 of the restraint bar. A bushing 50 is also used on the pivot arm 48 shown in FIG. 5, but the pivot arm on that side of the cab is held adjacent leg 34 of base bracket 30. Both pivot arms 48 are held adjacent the inside leg of their respective bases 30.

A spring assembly 60 is mounted on each of the restraint bar bracket assemblies. The spring assemblies include compression springs 66 having first ends supported on inwardly bent legs 62A and 64A on spring mount brackets 62 and 64 on the respective sides of the restraint bar. The compression springs 66 are mounted over sliding rods 68 using suitable bushings 70 at the opposite ends of the springs. The bushings 70 at the first ends of the springs 66 are supported on legs 62A and 64A. Each rod 68 has a clevis 72 at the respective second end, and each clevis is pivoted with a pin 74 to one of the legs of the bases 30 of bracket assemblies 26 and 28.

As shown in FIG. 4, the clevis 72 for the spring 66 on that side of the restraint bar is mounted on the bracket leg 34, and as shown in FIG. 5, the clevis 72 for the bracket assembly 26 is mounted on the leg 32 of that bracket 30. The upper bushing 70 of each adjacent the clevis 72 is anchored to the rod 68 so the spring force acts against respective leg 62A or 64A. The springs 66 are of length so that they will exert a force against the legs 62A or 64A tending to pivot the restraint bar about the pivot pins 49. The spring mount brackets 62 and 64 are welded onto the respective pivot arm 48, and the position of the spring pivot pin 74 for the clevis, the openings through which the rods 68 pass on the legs 62A and 64A, and the position of pivot pins 49 for the pivot arms 48 will determine how the loading from the springs will affect the pivoting of the operator restraint bar. The brackets 62 and 64 have stop flanges 79 bent down from the legs 62A and 64A and extending generally parallel to walls 40 of the bases 30 with the restraint bar in its lowered position.

Figure 2:
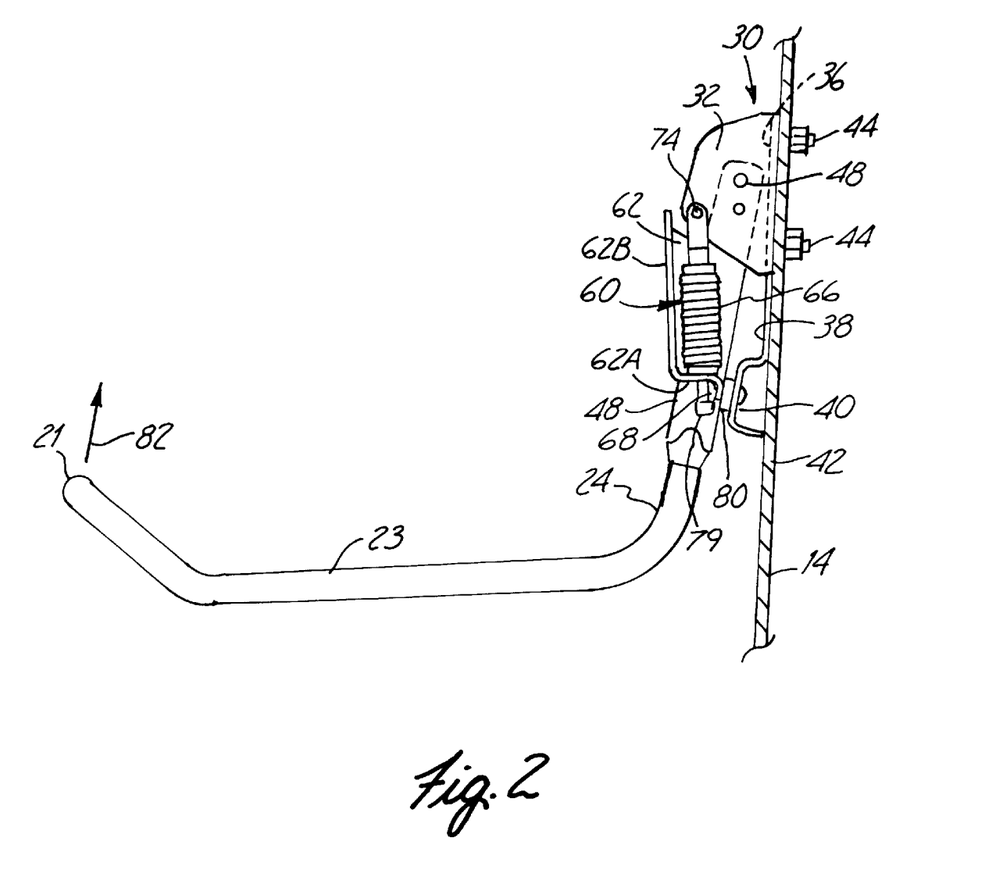
FIG. 2 is a fragmentary side elevational view of the restraint bar of the present invention in a working position.

When the restraint bar is in the lowered position shown in FIG. 2, the springs 66 will urge the operator restraint bar and stop flanges 79 joined to the inner ends of legs 62A and 64A of the spring mount brackets against a stop cushion 80 that is mounted on the offset stop wall 40 of the respective formed base 30. A stopped working position is assured. The operator restraint bar 20 is thus positively located in its working position.

Figure 1:
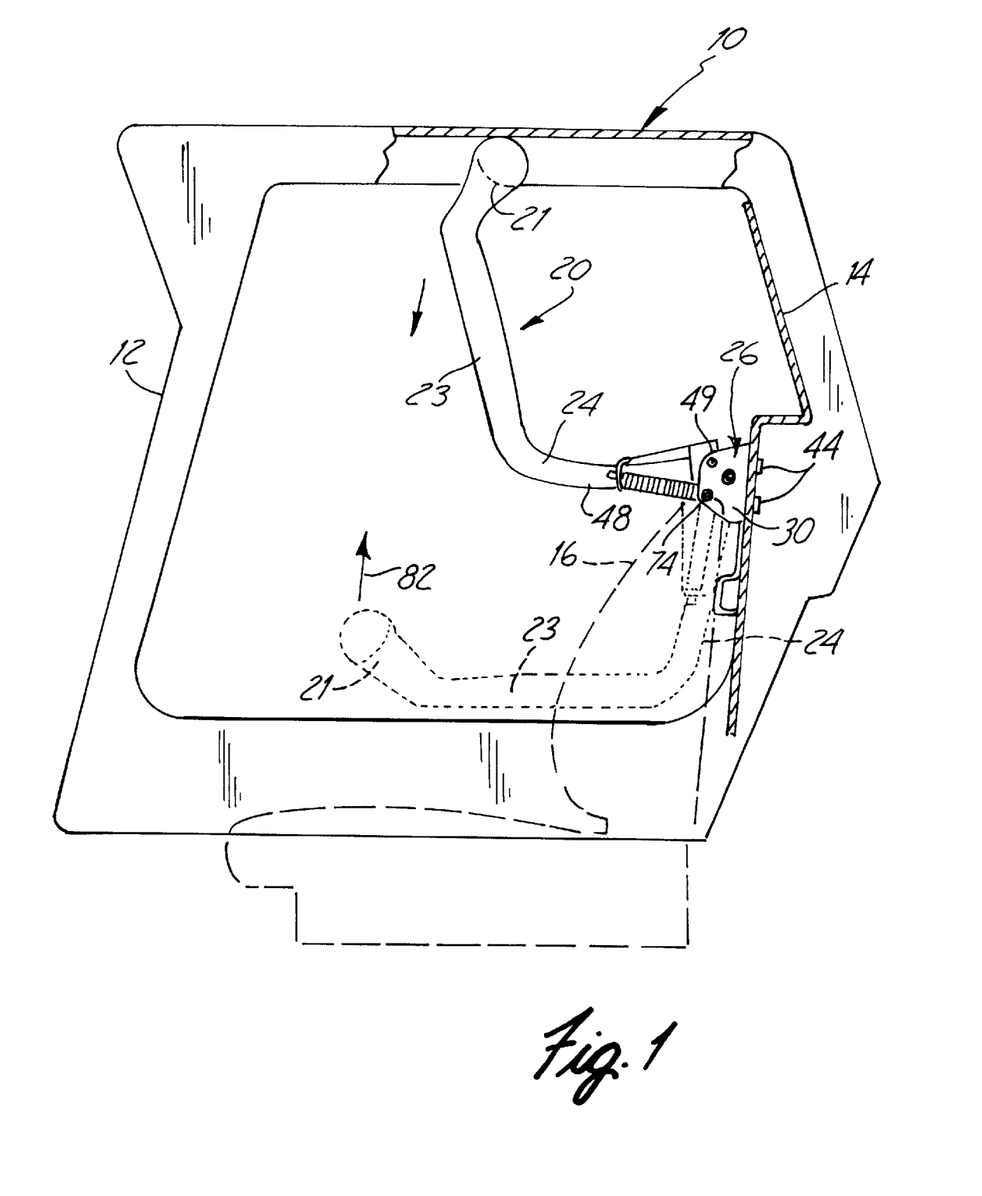
FIG. 1 is a schematic side view showing a restraint bar made according to the present invention in a raised position in a cab of a skid steer loader and in its working position in dotted lines.

The force from the springs 66 urging the outer laterally extending portion 21 downwardly will result in the need for a lifting force at the outer end of the restraint bar, as indicated by the arrow 82 in FIGS. 1 and 2, of approximately 25 pounds, so that the restraint bar 20 will be held down in working position unless a positive force is used to lift the restraint bar so it pivots about its pivot pins 49.

When the restraint bar 20 is in its raised position as shown in FIG. 1, the effective mounting points of springs 66 defining a line of force that has gone over center relative to the pivot pins 49, and the clevis pin 74 is below the line between the pivot pin 49 for the restraint bar and the openings for rods 68 in the legs 62A and 64A that support the springs, so the springs 66 also act to hold the restraint bar 20 in its raised position.

The springs 66 are selected so that the downward force to pull the restraint bar down from its raised position shown in FIG. 1 is less than that needed to lift the bar, and it would be about 15 pounds.

The spring mount brackets 62 and 64 have forward walls 62B and 64B that shield the springs 66 substantially, as shown in FIGS. 4 and 5, and protects them from damage, as well as shielding them from exterior members.

It should be noted that the clevis pins 74 are supported on shouldered bushings 84 that have a flange that rides against the respective legs 32 or 34 of the bracket 30, and have a large diameter outer sleeve section that passes through a large opening in the respective bracket leg 32 or 34 to provide a greater surface area for pivoting and to support the springs on the relatively narrow legs 32 and 34 of the bases 30. The bushings 84 provide a larger surface area for operation, and are similar to the use of the bushing 50 for the pivoting arms 48.

The bracket assembly 26 includes components for sensing the position of the operator restraint bar when it is in its lowered position, to provide an interlock signal that will enable operation of the loader only when the restraint bar is down. If the restraint bar is not in its lowered position, the loader cannot be operated.

Figure 6:
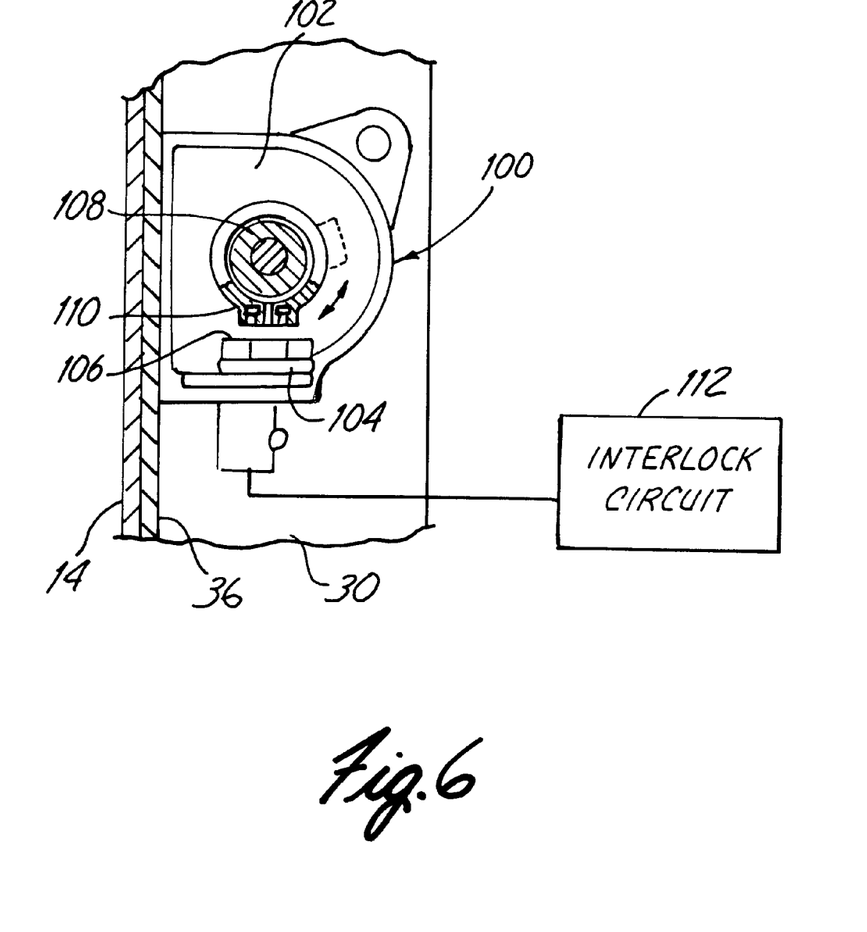
FIG. 6 is a sectional view taken as on Line 6—6 in FIG. 5.

As can be seen in FIG. 6, a Hall Effect sensor assembly 100 is mounted onto the leg or wall 32 of the base 30 forming part of the bracket assembly 26, and includes a part annular support frame 102 spaced from a rotating bushing 108 that rotates with the restraint bar about pivot pin 49. The frame 102 supports a circuit board 104 at a lower side, and the circuit board 104 has a Hall Effect sensor 106 that is positioned adjacent to the rotating bushing 108. The bushing 108 also serves as a spacer to bear on flange 52 for the bushing 50 on bracket assembly 26. The pivoting arm 48 on bracket assembly 26 is thus held adjacent leg 34 of that base 30.

The bushing 108 is keyed so it will turn with the pivot arm 48 on that side of the restraint bar. The bushing mounts a pair of magnets 110 that will move arcuately as the restraint bar pivots to its raised position, so the magnets 110 become spaced a greater distance from the Hall Effect sensor 106 than when the bar is in its lowered position as shown in FIG. 6.

When the restraint bar 20 is in the lowered position, the magnets 110 will affect the Hall Effect sensor 106 in a known manner and a signal will be provided to an interlock circuit 112. The signal that the restraint bar is in its lowered position will arm the interlock circuit with a signal indicating that at least one of the conditions for operation of the loader has been met. If there are other inputs to the interlock circuit, such as a sensor to sense that an operator is seated in the seat 16, those signals also have to be in the proper state for operation of the loader.

When the restraint bar is raised, however, the magnets 110 are spaced from the Hall Effect sensor 106 and the lack of a signal to the interlock circuit 112 will lock up the loader operational functions so that the loader cannot be moved, and the boom or bucket or whatever other implement is on the loader cannot be operated until the restraint bar is moved to its working, lowered position. Additional inputs to the interlock circuit can also be an operator energized switch that would have to be pushed after the operator was sitting in the seat, or similar interlock functions.

The individual bracket assemblies 26 and 28 can be preassembled onto the operator restraint pivot bars 48, and thus the operator restraint forms a complete sub-assembly that can be made separate from the loader cab and other portions of the loader, as shown in FIG. 6, and then merely bolted in place on the loader as a unit.

Figure 8:
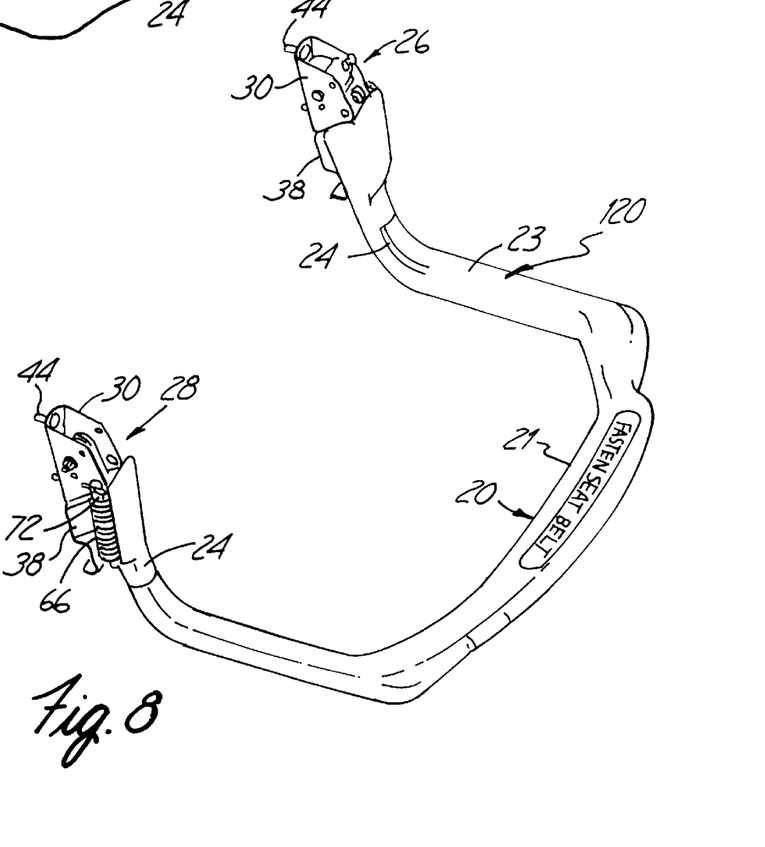
FIG. 8 is a perspective view of an assembled restraint bar made according to the present invention ready for installation as a unit into a skid steer loader.

FIG. 8 shows the finished sub assembly wherein the restraint bar 20 is covered with a suitable foam padding indicated at 120. The foam padding also will cover the shields or flanges 64B and 62B of the spring mount brackets 62 and 64.

Thus, the bracket assemblies are easily made, and provide positive positioning of the restraint bar in raised and lowered positions, as well as ensuring that the installation is done with a minimum of time by having the ability to pre-assemble the brackets and the seat bar.

The use of a mechanical (coil) spring and the formed spring mounting bracket makes the operation very reliable. It should also be noted that a single bracket can be used if the restraint bar has one reasonably extending arm on one side of a cross or lap bar, so the restraint is L-shaped.

Although the present invention has been described with reference to preferred embodiments, workers skilled in the art will recognize that changes may be made in form and detail without departing from the spirit and scope of the invention.

What is claimed is:

1. A rear mounted operator restraint bar for a cab having a rear wall, the restraint bar being U-shaped and having a pair of side arms, a pair of main mounting brackets, said side arms being pivotally mounted on the main mounting brackets about a first pivot axis and movable between a lowered working position to restrain an operator and a raised position, the main mounting brackets each having a mounting wall that is adapted to be supported on the rear wall of the cab, a spring mount bracket attached to at least one side arm, a compression spring having a first end bearing against a portion of spring mount bracket for applying a force at a first location on the at least one side arm and having an opposite end pivotally mounted on the associated main mounting bracket at a spring pivot axis forming a pivotal connection off-set from the first pivot axis of an associated side arm, the spring pivot axis on the associated main mounting bracket and the first location being positioned so the spring urges the restraint bar to remain in its working position, the restraint bar being movable away from its working position toward its raised position and the first location moving as the restraint bar is pivoted toward its raised position so the spring acts to urge the restraint bar to its raised position, when the restraint bar is moved from the working position toward its raised position a selected amount.

2. The rear mounted restraint bar of claim 1 wherein the spring mount bracket is welded to the associated side arm of the restraint bar.

3. The rear mounted restraint bar of claim 1 wherein said main mounting brackets comprise channel shaped brackets having first and second side legs, and bracket base walls that rest against the rear wall of the cab and comprise the mounting walls, each of the first side legs being positioned toward an adjacent lateral side of the cab, and each second leg being spaced inwardly from the first leg of its associated bracket, and the side arms of the restraint bar being pivotally mounted to the second legs of the main mounting brackets, respectively.

4. The rear mounted restraint bar of claim 3, wherein the pivotal connection of the spring to the associated main mounting bracket is a connection to the first leg of the associated mounting bracket.

5. The rear mounted restraint bar of claim 3 and pivot bushings for pivotally mounting the side arms to the main mounting brackets.

6. The rear mounted restraint bar of claim 3, wherein at least one of the restraint bar arms has a sensor for sensing a pivotal position of the restraint bar.

7. The rear mounted restraint bar of claim 6, wherein said sensor comprises a Hall Effect sensor including a first portion and a second portion, the first portion being mounted on a sensor bracket adjacent the first pivot axis of the at least one side arm and the other portion of the Hall Effect sensor being mounted for movement about the first pivot axis of the at least one side arm when the restraint bar is pivoted.

8. The rear mounted restraint bar of claim 1, wherein said mounting walls of the main mounting brackets have stop members formed on said mounting walls spaced from the first pivot axis for engaging the respective side arms of the restraint bar when the restraint bar is in its working position.

9. The rear mounted restraint bar of claim 7, wherein a restraint bar sub-assembly is formed with the main mounting brackets, the compression springs, the stop members and the restraint bar, said sub assembly being adapted to be installed as a unit directly on the rear wall of the cab.

10. A rear mounted operator restraint bar for a cab having a rear wall, the restraint bar being U-shaped and having a pair of side arms, a pair of mounting brackets, each of said side arms being pivotally mounted on a separate one of the mounting brackets, the mounting brackets each having a mounting wall that rests against the rear wall of the cab, a separate spring mount bracket attached to each of the respective side arms, a separate spring on each spring mount bracket, each spring having a first end bearing against a portion of the respective spring mount bracket and each spring having an opposite end mounted on the respective mounting bracket at a spring pivot offset from the pivotal mountings of the side arms, a force of the springs urging the restraint bar toward a working position and as the restraint bar moves away from the working position the force of the springs acting to urge the restraint bar toward a raised position.

11. The rear mounted restraint bar of claim 10, wherein said mounting brackets comprise channel shaped brackets each having first and second side legs joined to the respective mounting wall, the mounting walls comprising base walls that rest against the rear wall of the cab, the first side legs of the respective mount brackets being positioned toward adjacent lateral sides of the cab, and the second side legs being spaced inwardly from the respective first side legs, and the side arms of the restraint bar being pivotally mounted to the second side legs of the respective mounting bracket.

12. The rear mounted restraint bar of claim 11, wherein the second pivots of the springs are on the first side legs of the respective mounting brackets.

13. The rear mounted restraint bar of claim 11, wherein at least one of the restraint bar arms has a sensor mounted on the associated mounting bracket for sensing a pivotal position of the restraint bar.

14. The rear mounted restraint bar of claim 10, wherein said mounting brackets have base wall sections that extend in a direction away from the pivotal mountings of the side arms, and stop members formed on said base wall sections for engaging the side arms of the restraint bar, respectively, and stopping the restraint bar in a working position.

15. A restraint bar for a loader operator cab, the restraint bar being pivotally mounted on a bracket assembly including a base adapted to mount on a rear wall of a loader cab, the base having a leg extending outwardly from the base, a restraint bar arm pivotally mounted on the leg of the bracket assembly, a spring mount bracket on the restraint bar arm and associated with the bracket assembly, the spring mount bracket comprising a spring support wall fixed to the restraint bar arm, a compression spring having one end bearing against the spring support wall, the opposite end of the compression spring being pivoted on a pivot connection to the leg of the bracket assembly at a position spaced from the restraint bar arm pivotal mounting to the leg, and the ends of the compression spring being positioned to urge the restraint bar arm to pivot about its pivotal mounting to a working position, the spring mount bracket including a stop wall and forming a stop engaging a portion of the bracket assembly to stop pivotal movement of the restraint bar at its working position.

16. The restraint bar of claim 15, wherein the pivotal mounting of the restraint bar arm, and the ends of the compression spring are positioned so the spring force acts on an opposite side of the pivotal mounting of the restraint bar arm to cause the restraint bar arm to be urged to a raised position when the restraint bar arm is pivoted away from its working position a selected amount.

17. The restraint bar of claim 15, wherein the restraint bar has two bracket assemblies and there are formed spring brackets and compression springs at each of the bracket assemblies.

18. An assembly of a wall mounted operator restraint bar for an implement cab, the assembly being mountable as a unit to a wall of an implement cab, the restraint bar being U-shaped and having a pair of side arms, a pair of main mounting brackets, said side arms being mounted to the main mounting brackets, respectively, on first pivot axes, the main mounting brackets each having a mounting wall for attachment to an implement cab, a pair of springs having first ends coupled to the side arms, respectively, and having second ends supported on the respective main mounting bracket at a location offset from the first pivot axes, the springs urging the side arms to pivot relative to the main mounting brackets to move the restraint bar to a first position, the main mounting brackets having stops engaging the respective side arms in the first position of the restraint bar, the side arms being pivotable away from the first position and the first ends of the springs moving with the side arms as the restraint bar is pivoted about the first pivot axes, away from the first position so that after the side arms have pivoted about the first pivot axis away from the first position a selected amount, the springs urge the side arms to continue to pivot away from the first position.

19. The assembly of claim 18, wherein said main mounting brackets each comprise a channel shaped bracket having first and second spaced side legs joined to the mounting walls, and the side arms of the restraint bar being pivotally mounted to the second side legs of the main mounting brackets, respectively.

20. The assembly of claim 19 and separate spring mounts pivotally mounting the second ends of the springs to the first legs of the main mounting brackets, respectively.

* * * * *